United States Patent
Nedeltchev

(10) Patent No.: US 7,706,314 B2
(45) Date of Patent: Apr. 27, 2010

(54) APPROACH FOR IMPLEMENTING IPSEC IN PERFORMANCE ENHANCING PROXY (PEP) ENVIRONMENTS

(75) Inventor: Plamen Nedeltchev, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 794 days.

(21) Appl. No.: 11/133,944

(22) Filed: May 20, 2005

(65) Prior Publication Data

US 2006/0262783 A1 Nov. 23, 2006

(51) Int. Cl.
*H04B 7/185* (2006.01)
*H04W 4/00* (2009.01)
*H04J 3/24* (2006.01)
*H04L 12/28* (2006.01)
*H04L 12/56* (2006.01)
*H04J 3/16* (2006.01)
*H04J 3/22* (2006.01)
*H04L 29/06* (2006.01)
*G06F 11/30* (2006.01)
*G06F 9/00* (2006.01)
*G06F 15/16* (2006.01)
*G06F 17/00* (2006.01)

(52) U.S. Cl. ................ 370/316; 370/338; 370/349; 370/389; 370/466; 370/469; 370/470; 713/161; 713/189; 726/14

(58) Field of Classification Search ................ 370/389
See application file for complete search history.

(56) References Cited

U.S. PATENT DOCUMENTS

| | | | | |
|---|---|---|---|---|
| 6,816,455 | B2 * | 11/2004 | Goldberg et al. | 370/230 |
| 6,975,647 | B2 * | 12/2005 | Neale et al. | 370/466 |
| 7,017,042 | B1 * | 3/2006 | Ziai et al. | 713/161 |
| 7,188,365 | B2 * | 3/2007 | Balissat et al. | 726/15 |
| 7,360,083 | B1 * | 4/2008 | Ragireddy et al. | 713/160 |
| 2002/0042875 | A1 * | 4/2002 | Shukla | 713/151 |
| 2005/0256975 | A1 * | 11/2005 | Kaniz et al. | 709/250 |
| 2006/0190720 | A1 * | 8/2006 | Ozaki et al. | 713/160 |

OTHER PUBLICATIONS

Firewall Enhancement Protocol, M. Gaynor, 2001.*
RFC 3093, Firewall Enhancement Protocol, FEP, Gaynor et al. 2001.*
J. Border et al., Performance Enhancing Proxies Intended to Mitigate Link-Related Degradations, Jun. 2001.*

* cited by examiner

*Primary Examiner*—Daniel J Ryman
*Assistant Examiner*—Nishant B Divecha
(74) *Attorney, Agent, or Firm*—Hickman Palermo Truong & Becker LLP

(57) ABSTRACT

An approach is provided for implementing IPsec in PEP environments. The approach generally involves preserving TCP header data contained in packets prior to IPsec encryption and making the TCP header data available to PEP applications. For example, TCP header data is identified in a packet that conforms to the TCP and a copy of the TCP header data is generated. Encrypted packet data is generated by encrypting at least a portion of the packet using IPsec. For example, the TCP header data and payload may be encrypted to generate the encrypted packet data. A modified copy of the TCP header data is generated by modifying length data contained in the copy of the TCP header data to reflect a length of at least the encrypted packet data. A new packet is generated that includes the modified copy of the TCP header data and the encrypted packet data.

20 Claims, 9 Drawing Sheets

APPROACH FOR IMPLEMENTING IPSEC IN PERFORMANCE ENHANCING PROXY (PEP) ENVIRONMENTS

FIELD OF THE INVENTION

This invention relates generally to networking, and more specifically, to an approach for implementing IPsec in Performance Enhancing Proxy (PEP) environments.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Transmission Control Protocol (TCP) is one of the most widely used communications protocols on the Internet. A wide variety of applications use TCP and numerous TCP-based protocols have been developed around TCP, such as the HyperText Transfer Protocol (HTTP) and the File Transfer Protocol (FTP).

There are well-known and studied performance issues with TCP in communications systems that include high latency links. For example, RFC 2760 "Ongoing TCP Research Relating to Satellites" describes that TCP suffers from significant throughput degradation in Long Flat Networks (LFNs) and Long Thin Networks (LTNs) that are typically associated with satellite, Wireless Wide Area Networks (WWANs) and Wireless Local Area Networks (WLANs). TCP performance issues are generally attributable to the characteristic that TCP is a connection-oriented communications protocol. TCP includes an initial three-way handshake, a sliding window mechanism, variable response times, an acknowledgement for every packet and an excessive number of concurrent sessions, that all contribute to performance degradation in high latency links. Also, in TCP, lost data has to be re-sent and errors are often mis-characterized as network congestion, which triggers TCP's slow starting congestion avoidance mechanism.

Numerous approaches have been employed to address the limitations of TCP in networks with high latency links. For example, many satellite and WWAN-based Internet Service Providers (ISPs) implement different Performance Enhancing Proxies (PEPs) that alter or proxy the TCP to achieve increases in performance.

One of the problems with using conventional PEP techniques to address the aforementioned problems is that the conventional PEP techniques require the ability to examine the IP and TCP header information contained in TCP packets. In both the transport and tunnel encryption modes of IPsec, the TCP header information is encrypted and therefore cannot be examined. The original IP header data is also encrypted and cannot be examined in the tunnel encryption mode of IPsec. Hence, IPsec cannot be used in PEP environments. Based on the foregoing, there is a need for an approach for implementing IPsec in PEP environments and in particular, in PEP environments that include high latency communications links.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
    II. PEP-COMPATIBLE TCP/IP PACKET STRUCTURE FOR IPSEC IN TRANSPORT MODE
    III. PEP-COMPATIBLE TCP/IP PACKET STRUCTURE FOR IPSEC IN TUNNEL MODE
    IV. PEP-COMPATIBLE TCP/IP PACKET STRUCTURE FOR GRE INSIDE IPSEC IN TRANSPORT MODE
    V. PEP-COMPATIBLE TCP/IP PACKET STRUCTURE FOR GRE INSIDE IPSEC IN TUNNEL MODE
    VI. IMPLEMENTATION MECHANISMS

I. Overview

An approach is provided for implementing IPsec in PEP environments. The approach generally involves preserving TCP header data contained in packets prior to IPsec encryption and making the TCP header data available to PEP applications. For example, TCP header data is identified in a packet that conforms to the TCP and a copy of the TCP header data is generated. Encrypted packet data is generated by encrypting at least a portion of the packet using IPsec. For example, the TCP header data and payload may be encrypted to generate the encrypted packet data. A modified copy of the TCP header data is generated by modifying length data contained in the copy of the TCP header data to reflect a length of at least the encrypted packet data. A new packet is generated that includes the modified copy of the TCP header data and the encrypted packet data.

The approach is applicable to both the transport and tunnel encryption modes of IPsec and both the Authentication Header (AH) and Encapsulating Security Payload (ESP) protocols. The approach is also applicable to any other type of security protocol used in combination with IPsec, for example, Generic Routing Encapsulation (GRE) used inside IPsec. The approach allows IPsec to be used in PEP environments without modifying the PEP techniques or Internet Service Providers (ISPs). This avoids compatibility issues with conventional packet processing hardware and firmware that is widely implemented.

II. PEP-Compatible TCP/IP Packet Structure for IPSEC in Transport Mode

Figure 1:
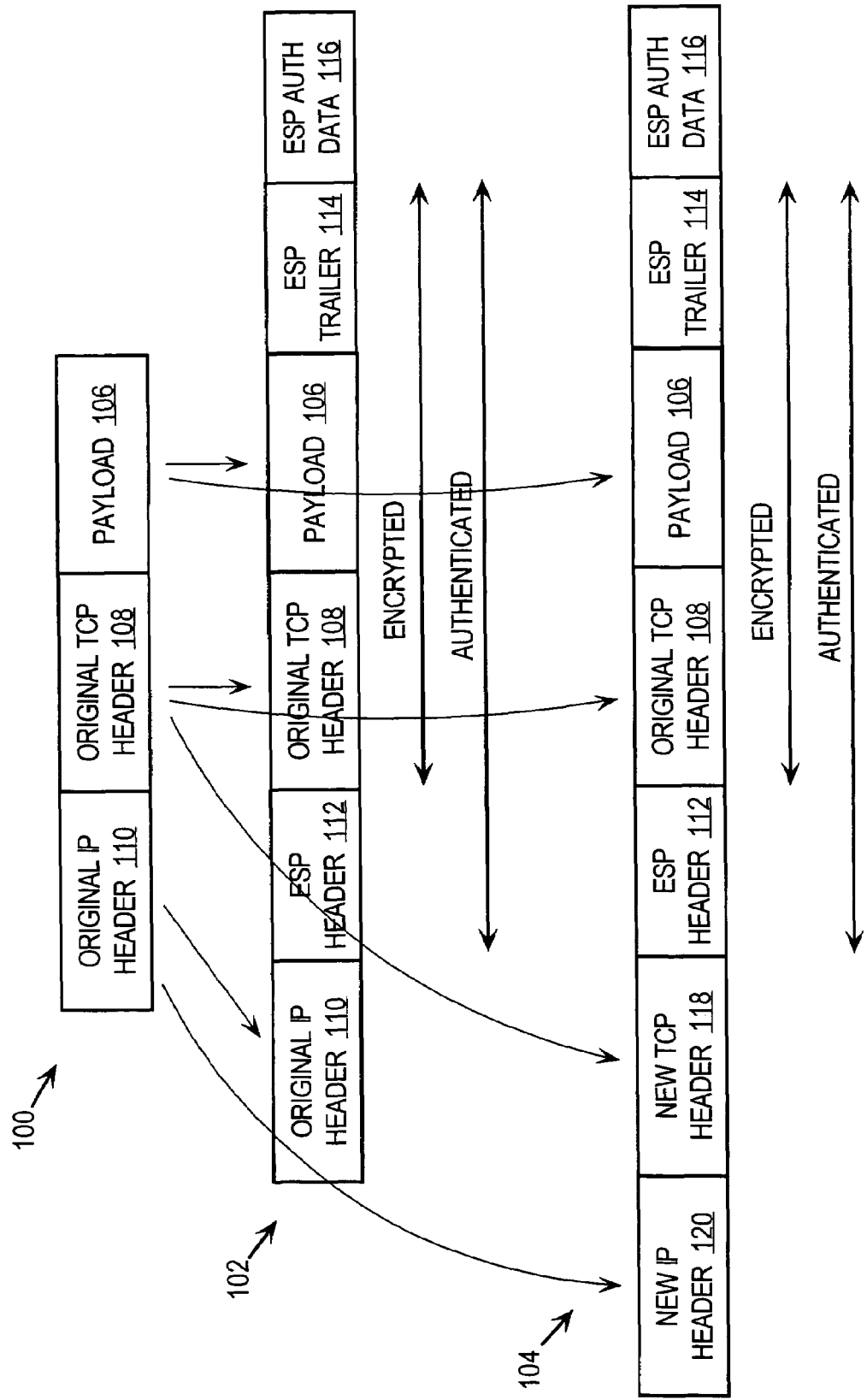
FIG. 1 is a block diagram that depicts a conventional TCP/IP packet structure, a conventional TCP/IP IPsec packet structure for the transport mode and a PEP-compatible TCP/IP IPsec packet structure for the transport mode according to an embodiment of the invention.

FIG. 1 is a block diagram that depicts a conventional TCP/IP packet structure 100, a conventional TCP/IP IPsec packet structure 102 for the transport mode and a PEP-compatible TCP/IP IPsec packet structure 104 for the transport mode according to an embodiment of the invention.

TCP/IP packet structure 100 includes a payload 106, an original TCP header 108 and an original IP header 110. TCP/IP IPsec packet structure 102 also includes payload 106, original TCP header 108 and original IP header 110. TCP/IP IPsec packet structure 102 further includes an ESP header 112, an ESP trailer 114 and optional ESP authentication data 116. Although various embodiments of the invention are described herein in the context of using the ESP protocol, the AH protocol may also be used and the invention is not limited to the ESP context. Furthermore, the approach is applicable to any other current or future IPsec protocols that may be developed.

With IPsec in the transport mode, payload 106 and original TCP header 108 are encrypted, while original IP header 110 is not encrypted. Also, payload 106, original TCP header 108, ESP header 112 and ESP trailer 114 are authenticated. Not encrypting original IP header 110 in the transport mode allows TCP/IP IPsec packets to be routed using the original IP header 110. Encrypting original TCP header 108 with payload 106 prevents the use of conventional PEP techniques.

PEP-compatible TCP/IP IPsec packet structure 104 includes payload 106 and original TCP header 108. PEP-compatible TCP/IP IPsec packet structure 104 also includes an ESP header 112, ESP trailer 114 and ESP authentication data 116. In accordance with the transport mode of encryption, both payload 106 and original TCP header 108 are encrypted as depicted in FIG. 1.

According to one embodiment of the invention, PEP-compatible TCP/IP IPsec packet structure 104 includes a new TCP header 118 added in front of ESP header 112. New TCP header 118 includes all of the data from original TCP header 108, except that a packet length value contained in new TCP header 118 is changed to reflect the new packet length. For example, the packet length value contained in new TCP header 118 may be changed to reflect the combined length of ESP header 112, original TCP header 108, payload 106, ESP trailer 114 and ESP authentication data 116.

PEP-compatible TCP/IP IPsec packet structure 104 also includes a new IP header 120 added in front of new TCP header 118. New IP header 120 includes all of the data from original IP header 110, except that a packet length value contained in new IP header 120 is changed to reflect the new packet length. For example, the new packet length value contained in new IP header 120 is changed to reflect the addition of new TCP header 118.

New IP header 120 and new TCP header 118 allow packets to be properly routed and also allow conventional PEP techniques to be applied. More specifically, new IP header 120 and new TCP header 118 appear to a router or PEP application as conventional IP and TCP headers, respectively, and allow ESP header 112, original TCP header 108, payload 106, ESP trailer 114 and ESP authentication data 116 to be conventionally processed as data.

Figure 2:
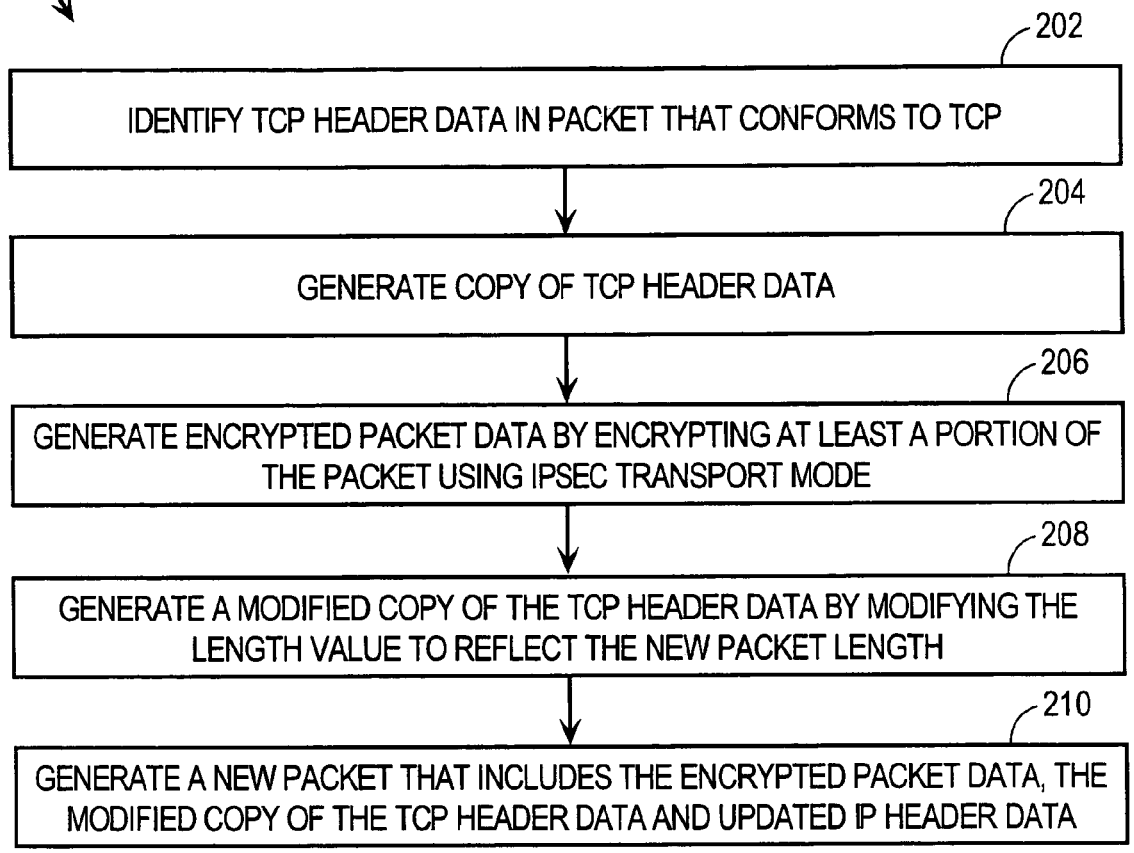
FIG. 2 is a flow diagram that depicts an approach for processing a packet using PEP-compatible TCP/IP IPsec packet structure for the transport mode, according to one embodiment of the invention.

FIG. 2 is a flow diagram 200 that depicts an approach for processing a packet using PEP-compatible TCP/IP IPsec packet structure 104 for the transport mode, according to one embodiment of the invention. In step 202, a packet is examined to identify TCP header data in the packet. For example, the packet may include a payload 106, an original TCP header 108 and an original IP header 110, as depicted in FIG. 1.

In step 204, a copy of the TCP header data is generated. For example, a copy is made of original TCP header 108 to generate new TCP header 118. In step 206, at least a portion of the packet is encrypted using the IPsec transport mode. For example, as indicated by PEP-compatible TCP/IP IPsec packet structure 104, original TCP header 108, payload 106 and ESP trailer 114 are encrypted.

In step 208, a modified copy of the TCP header data is generated by modifying a length value in the copy of the TCP header data to reflect the new packet length. For example, the length value in new TCP header 118 is updated to reflect the combined length of ESP header 112, original TCP header 108, payload 106, ESP trailer 114 and ESP authentication data 116.

In step 210, a new packet is generated that includes the encrypted packet data, the modified copy of the original TCP header data and updated IP header data. For example, the new packet includes the encrypted payload 106 and encrypted original TCP header 108. The new packet also includes new TCP header 118 and new IP header 120. As previously described herein, new TCP header 118 includes all of the data from original TCP header 108, except that a packet length value contained in new TCP header 118 is changed to reflect the new packet length. New IP header 120 includes all of the data from original IP header 110, except that a packet length value contained in new IP header 120 is changed to reflect the new packet length. The new packet may also include ESP header 112, ESP trailer 114 and ESP authentication data 116, if ESP is used.

III. PEP-Compatible TCP/IP Packet Structure for IPSEC in Tunnel Mode

Figure 3:
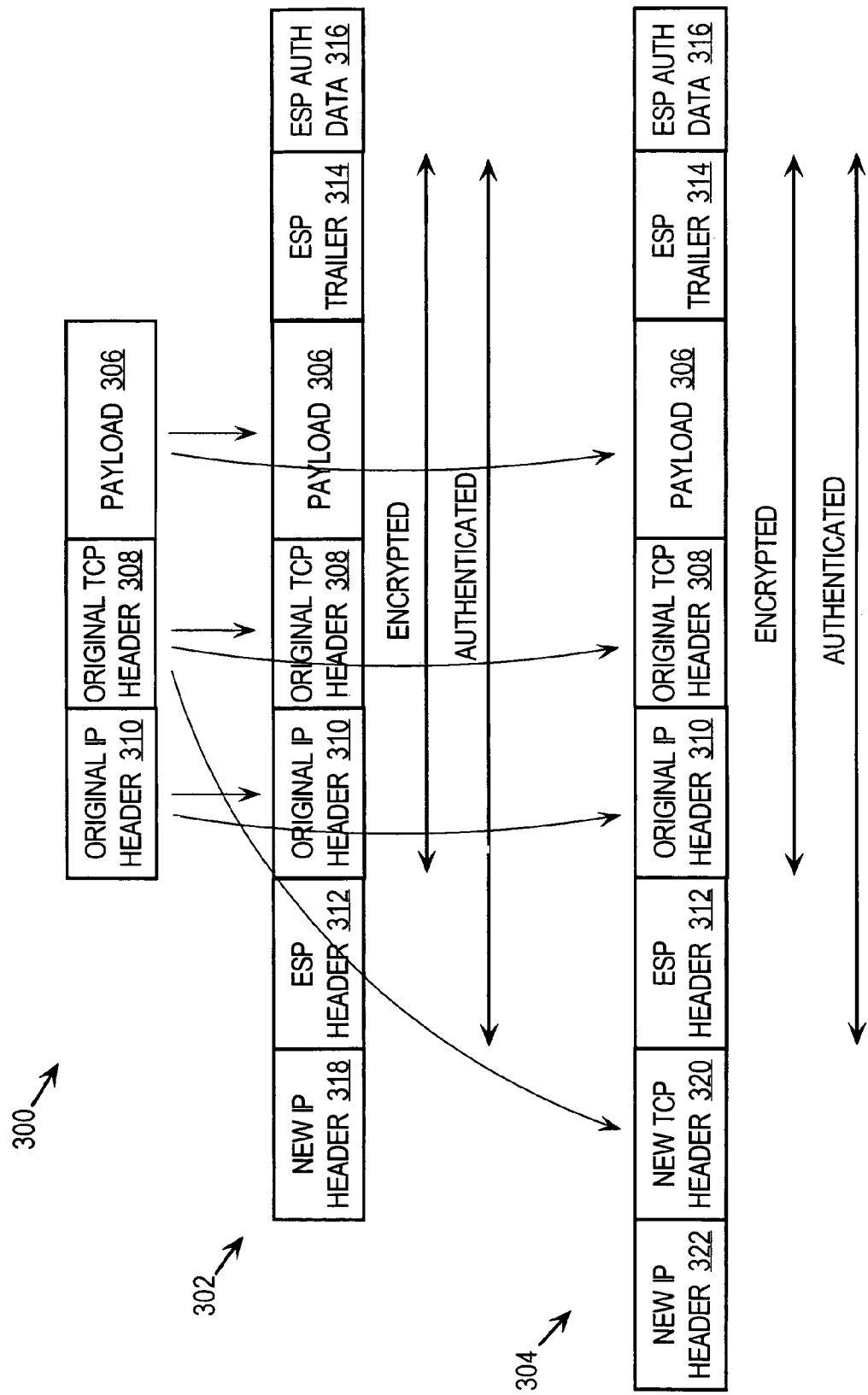
FIG. 3 is a block diagram that depicts a conventional TCP/IP packet structure, a conventional TCP/IP IPsec packet structure for the tunnel mode and a PEP-compatible TCP/IP IPsec packet structure for the tunnel mode according to an embodiment of the invention.

FIG. 3 is a block diagram that depicts a conventional TCP/IP packet structure 300, a conventional TCP/IP IPsec packet structure 302 for the tunnel mode and a PEP-compatible TCP/IP IPsec packet structure 304 for the tunnel mode according to an embodiment of the invention.

TCP/IP packet structure 300 includes a payload 306, an original TCP header 308 and an original IP header 310. TCP/IP IPsec packet structure 302 includes payload 306, original TCP header 308 and original IP header 310 as the conventional TCP/IP packet structure 300. TCP/IP IPsec packet structure 302 also includes an ESP header 312, an ESP trailer 314 and ESP authentication data 316. With IPsec in tunnel mode, payload 306, original TCP header 308, original IP header 310 and ESP trailer 314 are all encrypted. Also, payload 306, original TCP header 308, original IP header 310 and ESP trailer 314, ESP header 312 and ESP trailer 314 are authenticated. Since original IP header 310 is encrypted in the IPsec tunnel mode, a new IP header 318 is conventionally added to allow a packet that conforms to TCP/IP IPsec packet structure 302 to be properly routed. Encrypting original IP header 310 and original TCP header 308 with payload 306 prevents the use of conventional PEP techniques.

PEP-compatible TCP/IP IPsec packet structure 304 for the tunnel mode includes payload 306, original TCP header 308 and original IP header 310 as conventional TCP/IP packet structure 300. PEP-compatible TCP/IP IPsec packet structure 304 for the tunnel mode also includes an ESP header 312, ESP trailer 314 and ESP authentication data 316 as conventional TCP/IP IPsec packet structure 302 for the tunnel mode, assuming ESP is used. In accordance with the tunnel mode of encryption, payload 306, original TCP header 308, original IP header 310 and ESP trailer 314 are all encrypted.

According to one embodiment of the invention, PEP-compatible TCP/IP IPsec packet structure 304 for the tunnel mode includes a new TCP header 320 added in front of ESP header 312. New TCP header 320 includes all of the data from original TCP header 308, except that the packet length value is changed to reflect the new packet length. For example, the packet length value is changed to reflect the combined length of ESP header 312, original IP header 310, original TCP header 308, payload 306, ESP trailer 314 and ESP authentication data 316.

PEP-compatible TCP/IP IPsec packet structure 304 for the tunnel mode also includes a new IP header 322 added in front of new TCP header 320. New IP header 322 is similar to new EP header 318 added for the tunnel mode, except that the packet length value is changed to reflect the new packet length. For example, the packet length value in new IP header 318 is updated to reflect the combined length of new TCP header 320, ESP header 312, original IP header 310, original TCP header 308, payload 306, ESP trailer 314 and ESP authentication data 316.

New IP header 322 and new TCP header 320 allow packets to be properly routed and also allow conventional PEP techniques to be used with packets that conform to the PEP-compatible TCP/IP IPsec packet structure 304 for the tunnel mode without modification. More specifically, new IP header 322 and new TCP header 320 appear as conventional IP and TCP headers, respectively, and allow ESP header 312, original IP header 310, original TCP header 308, payload 306, ESP trailer 314 and ESP authentication data 316 to be conventionally processed as data.

Figure 4:
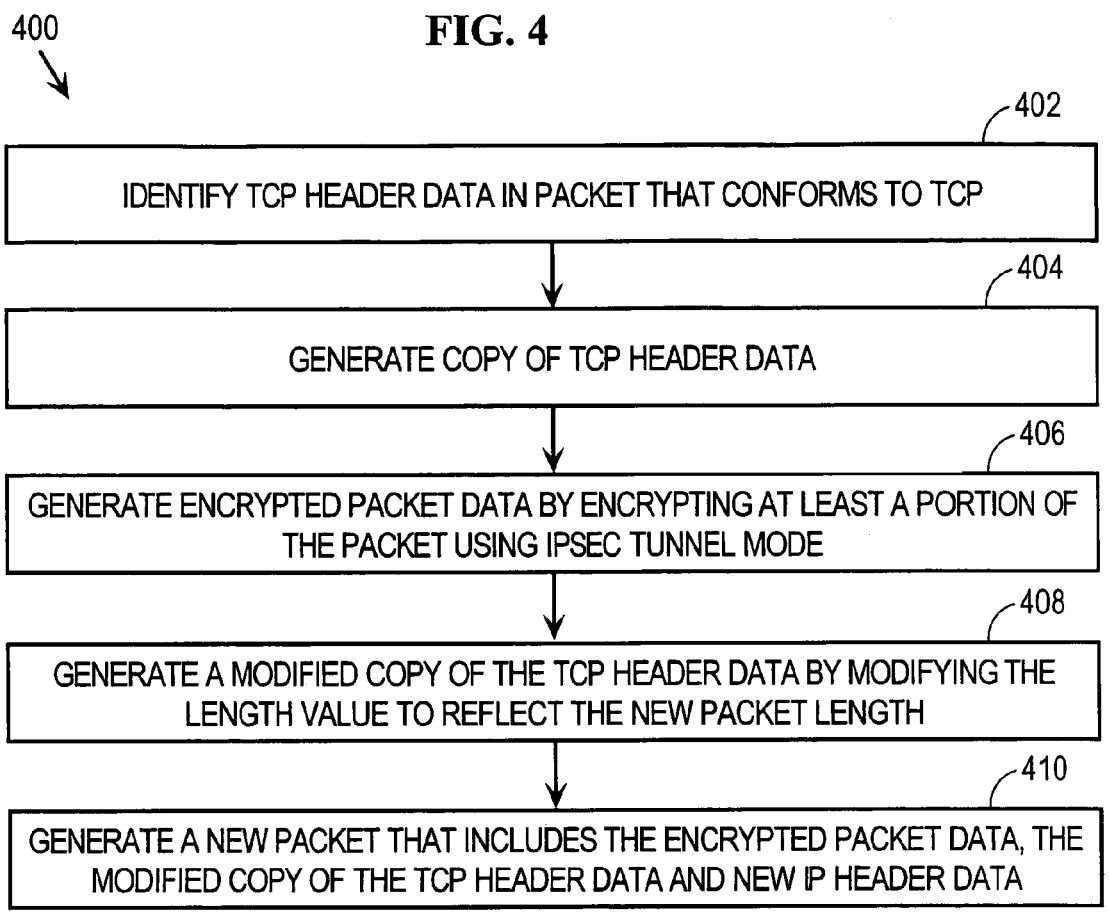
FIG. 4 is a flow diagram that depicts an approach for processing a packet using PEP-compatible TCP/IP IPsec packet structure for the tunnel mode, according to one embodiment of the invention.

FIG. 4 is a flow diagram 400 that depicts an approach for processing a packet using PEP-compatible TCP/IP IPsec packet structure 304 for the tunnel mode, according to one embodiment of the invention. In step 402, a packet is examined to identify TCP header data in the packet. For example, the packet may include a payload 306, an original TCP header 308 and an original IP header 310, as depicted in FIG. 3.

In step 404, a copy of the TCP header data is generated. For example, a copy is made of original TCP header 308 to generate new TCP header 320. In step 406, at least a portion of the packet is encrypted using the IPsec tunnel mode. For example, as indicated by PEP-compatible TCP/IP IPsec packet structure 304, original IP header 310, original TCP header 308, payload 306 and ESP trailer 314 are encrypted.

In step 408, a modified copy of the TCP header data is generated by modifying a length value in the copy of the TCP header data to reflect the new packet length. For example, the length value in new TCP header 320 is updated to reflect the combined length of ESP header 312, original IP header 310, original TCP header 308, payload 306, ESP trailer 314 and ESP authentication data 316.

In step 410, a new packet is generated that includes the encrypted packet data, the modified copy of the original TCP header data and new IP header data. For example, the new packet includes the encrypted payload 306, the encrypted original TCP header 308 and the encrypted original IP header 310. The new packet also includes new TCP header 320 and new IP header 322. As previously described herein, new TCP header 320 includes all of the data from original TCP header 308, except that a packet length value contained in new TCP header 320 is changed to reflect the new packet length. New IP header 322 includes all of the data from original IP header 310, except that a packet length value contained in new IP header 322 is changed to reflect the new packet length. The new packet also includes ESP header 312, ESP trailer 314 and ESP authentication data 316, if ESP is used.

IV. PEP-Compatible TCP/IP Packet Structure for GRE Inside IPSEC in Transport Mode As previously mentioned herein, the approach may be used in situations where other security protocols are used in combination with IPsec, for example, Generic Routing Encapsulation (GRE) used inside IPsec. Although embodiments of the invention are described herein in the context of GRE used inside IPsec, the approach is not limited to the GRE context and may be used with any security protocol used in combination with IPsec.

Figure 5:
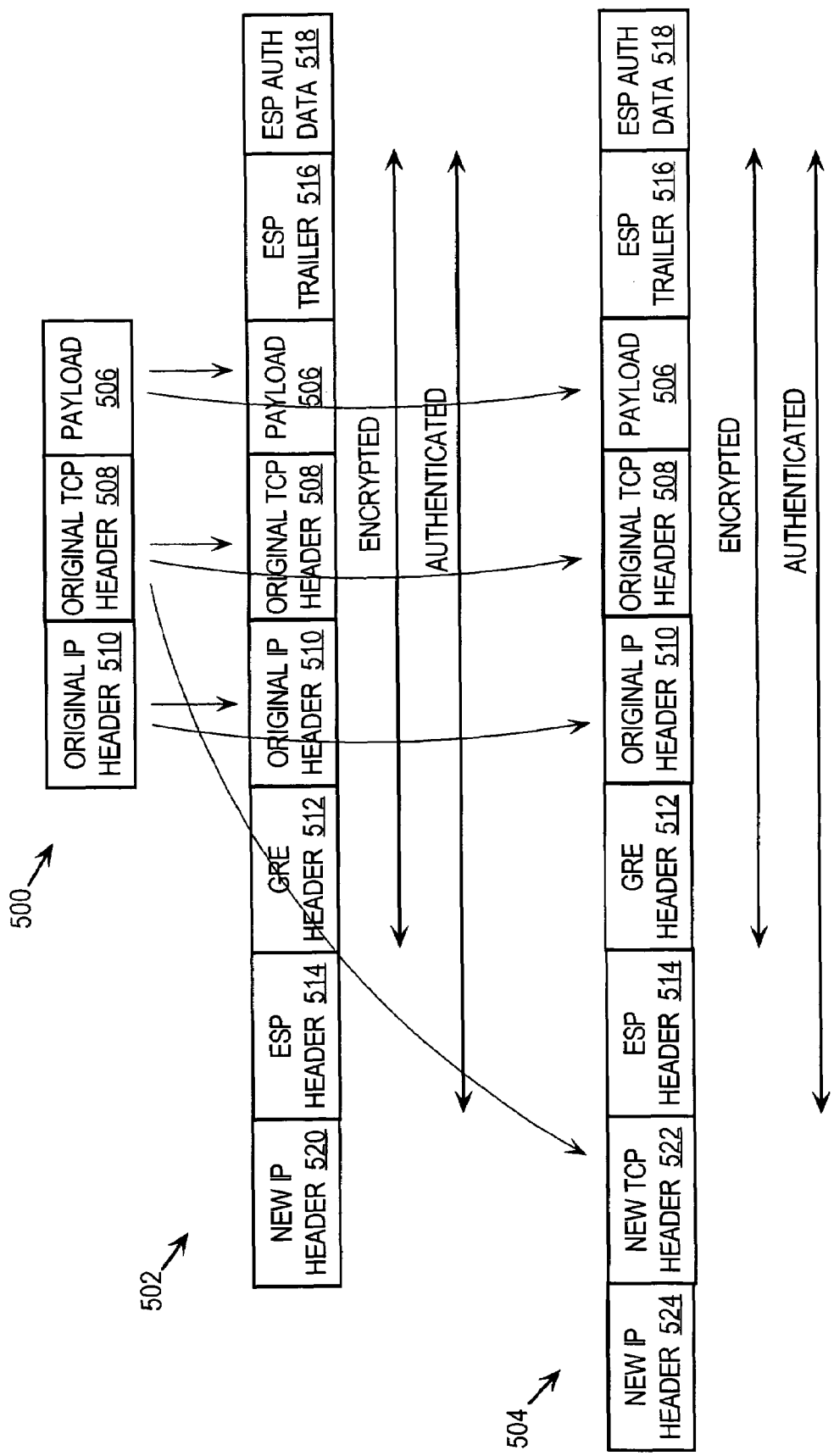
FIG. 5 is a block diagram that depicts a conventional TCP/IP packet structure, a conventional TCP/IP GRE inside IPsec packet structure for the transport mode and a PEP-compatible TCP/IP GRE inside IPsec packet structure for the transport mode according to an embodiment of the invention.

FIG. 5 is a block diagram that depicts a conventional TCP/IP packet structure 500, a conventional TCP/IP GRE inside IPsec packet structure 502 for the transport mode and a PEP-compatible TCP/IP GRE inside IPsec packet structure 504 for the transport mode according to an embodiment of the invention.

TCP/IP packet structure 500 includes a payload 506, an original TCP header 508 and an original IP header 510. TCP/IP GRE inside IPsec packet structure 502 also includes payload 506, original TCP header 508 and original IP header 510. TCP/IP GRE inside IPsec packet structure 502 further includes a GRE header 512, an ESP header 514, an ESP trailer 516 and optional ESP authentication data 518.

With GRE inside IPsec in the transport mode, GRE header 512, original IP header 510, original TCP header 508, payload 506 and ESP trailer 516 are encrypted. Also, ESP header 514, GRE header 512, original IP header 510, original TCP header 508, payload 506 and ESP trailer 516 are authenticated. Encrypting original TCP header 508 with GRE inside IPsec in the transport mode prevents the use of conventional PEP techniques.

PEP-compatible TCP/IP GRE inside IPsec packet structure 504 includes payload 506, original TCP header 508 and original IP header 510. PEP-compatible TCP/IP GRE inside IPsec packet structure 504 also includes GRE header 512, ESP header 514, ESP trailer 516 and ESP authentication data 518. With GRE inside IPsec in the transport mode, GRE header 512, original P header 510, original TCP header 508, payload 506 and ESP trailer 516 are encrypted. Also, ESP header 514, GRE header 512, original IP header 510, original TCP header 508, payload 506 and ESP trailer 516 are authenticated.

According to one embodiment of the invention, PEP-compatible TCP/IP GRE inside IPsec packet structure 504 includes a new TCP header 522 added in front of ESP header 514. New TCP header 522 includes all of the data from original TCP header 508, except that a packet length value contained in new TCP header 522 is changed to reflect the new packet length. For example, the packet length value contained in new TCP header 522 may be changed to reflect the combined length of ESP header 514, GRE header 512, original IP header 510, original TCP header 508, payload 506, ESP trailer 516 and ESP authentication data 518.

PEP-compatible TCP/IP GRE inside IPsec packet structure 504 also includes a new IP header 524 added in front of new TCP header 522. New IP header 524 includes all of the data from original IP header 510, except that a packet length value contained in new IP header 524 is changed to reflect the new packet length. For example, the new packet length value contained in new IP header 524 is changed to reflect the addition of new TCP header 522.

New IP header 524 and new TCP header 522 allow packets to be properly routed and also allow conventional PEP techniques to be applied. More specifically, new IP header 524 and new TCP header 522 appear to a router or PEP application as conventional IP and TCP headers, respectively, and allow ESP header 514, original TCP header 508, payload 506, ESP trailer 516 and ESP authentication data 518 to be conventionally processed as data.

Figure 6:
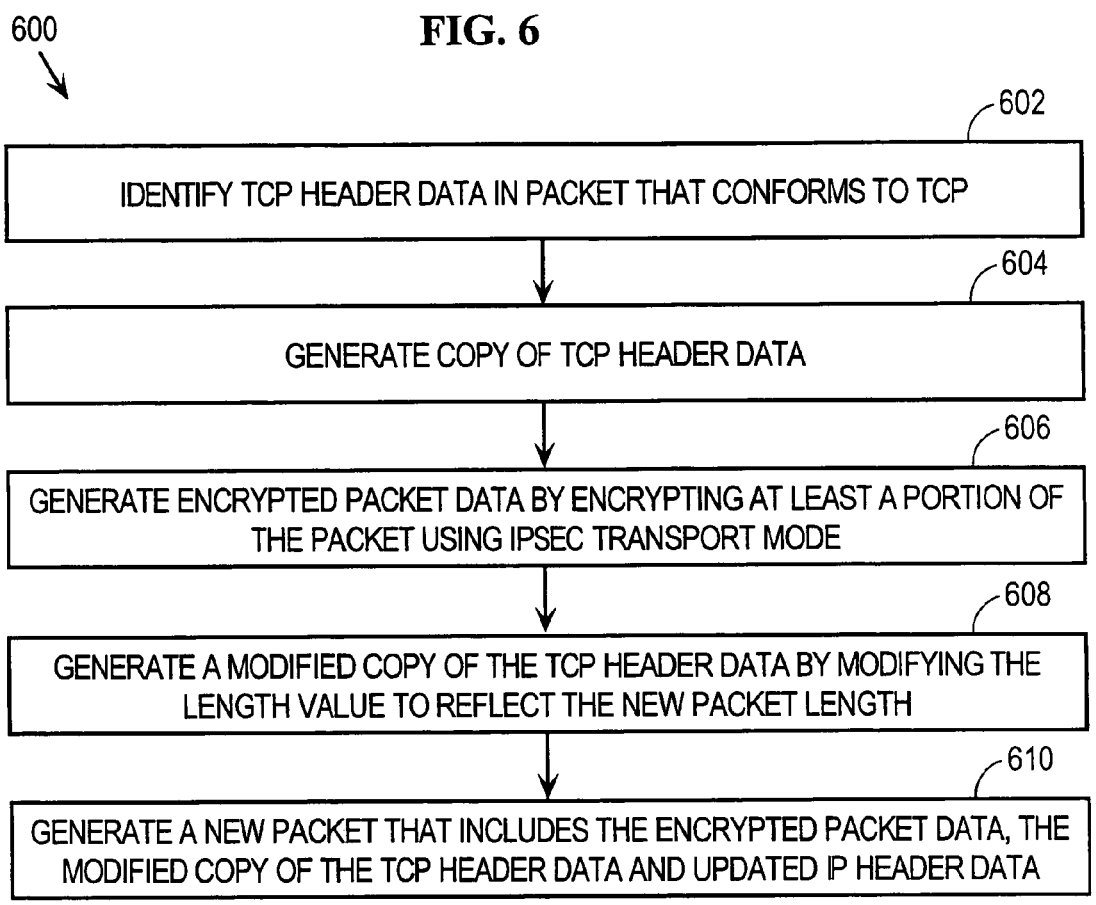
FIG. 6 is a flow diagram that depicts an approach for processing a packet using PEP-compatible TCP/IP GRE inside IPsec packet structure for the transport mode, according to one embodiment of the invention.

FIG. 6 is a flow diagram 600 that depicts an approach for processing a packet using PEP-compatible TCP/IP GRE inside IPsec packet structure 504 for the transport mode, according to one embodiment of the invention. In step 602, a packet is examined to identify TCP header data in the packet. For example, the packet may include a payload 506, an original TCP header 508 and an original IP header 510, as depicted in FIG. 5.

In step 604, a copy of the TCP header data is generated. For example, a copy is made of original TCP header 508 to generate new TCP header 522. In step 606, at least a portion of the packet is encrypted using GRE inside the IPsec transport mode. For example, as indicated by PEP-compatible TCP/IP GRE inside IPsec packet structure 504, this causes GRE header 512 to be generated and GRE header 512, original IP header 510, original TCP header 508, payload 506 and ESP trailer 516 to be encrypted.

In step 608, a modified copy of the TCP header data is generated by modifying a length value in the copy of the TCP header data to reflect the new packet length. For example, the length value in new TCP header 522 is updated to reflect the combined length of ESP header 514, GRE header 512, original IP header 510, original TCP header 508, payload 506, ESP trailer 516 and ESP authentication data 518.

In step 610, a new packet is generated that includes the encrypted packet data, the modified copy of the original TCP header data and new IP header data. For example, the encrypted portion of the new packet includes the GRE header 512, the original IP header 510, the original TCP header 508 and payload 506. The new packet also includes new TCP header 522 and new IP header 524. As previously described herein, new TCP header 522 includes all of the data from original TCP header 508, except that a packet length value contained in new TCP header 522 is changed to reflect the new packet length. New IP header 524 is generated when GRE is used with IPsec in the transport mode, because the original IP header 510 is encrypted. A packet length value contained in new IP header 524 reflects the new packet length. According to one embodiment of the invention, the packet length value contained in new IP header 524 reflects new TCP header 522.

V. PEP-Compatible TCP/IP Packet Structure for GRE Inside IPSEC in Tunnel Mode

Figure 7:
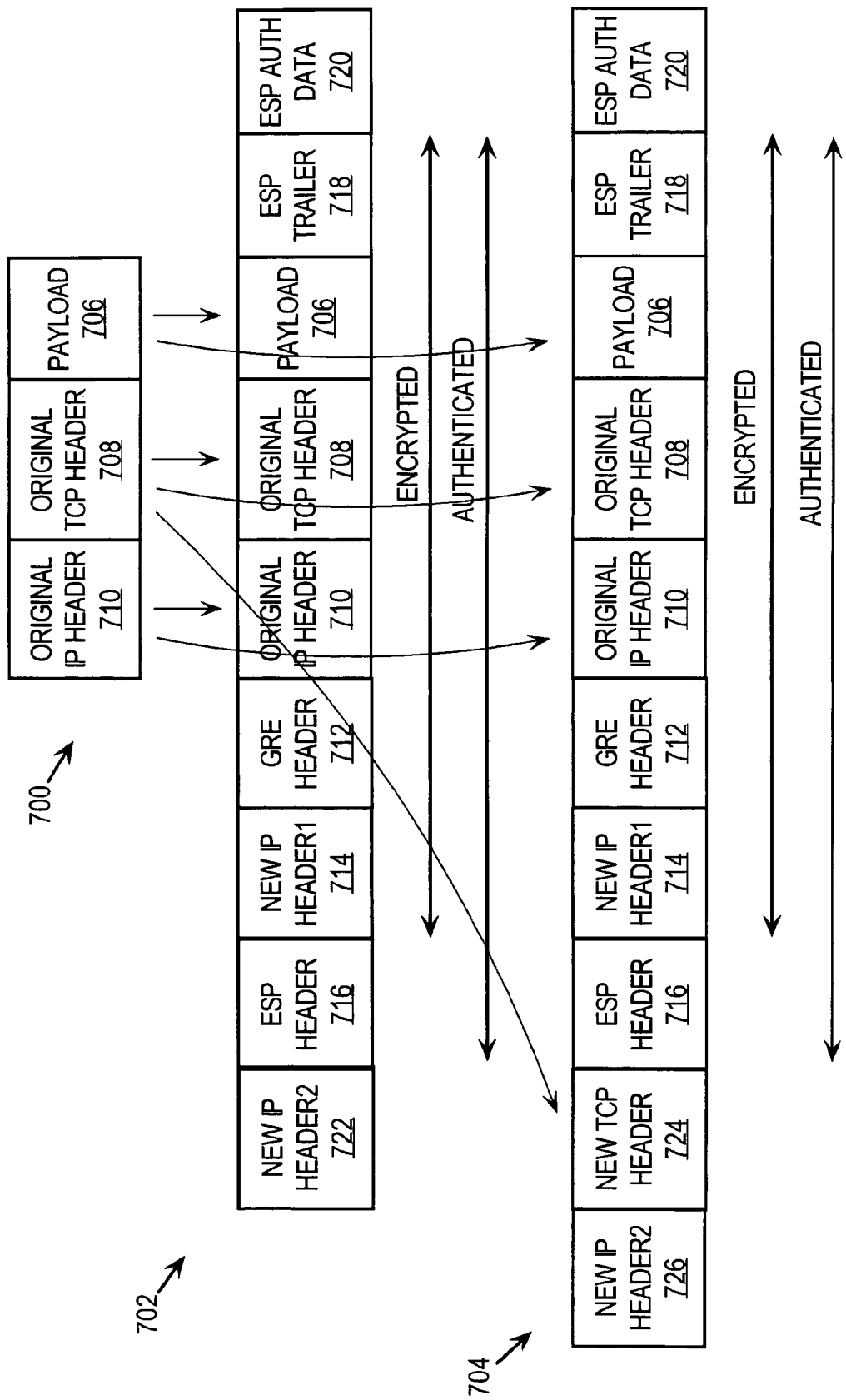
FIG. 7 is a block diagram that depicts a conventional TCP/IP packet structure, a conventional TCP/IP GRE inside IPsec packet structure for the tunnel mode and a PEP-compatible TCP/IP GRE inside IPsec packet structure for the tunnel mode according to an embodiment of the invention.

FIG. 7 is a block diagram that depicts a conventional TCP/IP packet structure 700, a conventional TCP/IP GRE inside IPsec packet structure 702 for the tunnel mode and a PEP-compatible TCP/IP GRE inside IPsec packet structure 704 for the tunnel mode according to an embodiment of the invention.

TCP/IP packet structure 700 includes a payload 706, an original TCP header 708 and an original IP header 710. TCP/IP GRE inside IPsec packet structure 702 also includes payload 706, original TCP header 708 and original IP header 710. TCP/IP GRE inside IPsec packet structure 702 further includes a GRE header 712, a new IP header1 714, an ESP header 716, an ESP trailer 718 and optional ESP authentication data 720. New IP header 1 714 is generated because with GRE inside IPsec, an IP header is included in the encrypted portion of the packet.

With GRE inside IPsec in the tunnel mode, new IP header1 714, GRE header 712, original IP header 710, original TCP header 708, payload 706 and ESP trailer 718 are encrypted. Also, ESP header 716, new IP header1 714, GRE header 712, original IP header 710, original TCP header 708, payload 706 and ESP trailer 718 are authenticated. Encrypting original TCP header 708 with GRE inside IPsec in the tunnel mode prevents the use of conventional PEP techniques.

PEP-compatible TCP/IP GRE inside IPsec packet structure 704 includes payload 706, original TCP header 708 and original IP header 710. PEP-compatible TCP/IP GRE inside IPsec packet structure 704 also includes GRE header 712, new IP header1 714, ESP header 716, ESP trailer 718 and ESP authentication data 720. With GRE inside IPsec in the tunnel mode, new IP header1 714, GRE header 712, original IP header 710, original TCP header 708, payload 706 and ESP trailer 718 are encrypted. Also, ESP header 716, new IP header1 714, GRE header 712, original IP header 710, original TCP header 708, payload 706 and ESP trailer 718 are authenticated.

According to one embodiment of the invention, PEP-compatible TCP/IP GRE inside IPsec packet structure 704 includes a new TCP header 724 added in front of ESP header 716. New TCP header 724 includes all of the data from original TCP header 708, except that a packet length value contained in new TCP header 724 is changed to reflect the new packet length. For example, the packet length value contained in new TCP header 724 may be changed to reflect the combined length of ESP header 716, new IP header1 714, GRE header 712, original IP header 710, original TCP header 708, payload 706, ESP trailer 718 and ESP authentication data 720.

PEP-compatible TCP/IP GRE inside IPsec packet structure 704 also includes a new IP header2 726 added in front of new TCP header 724. New IP header2 726 is similar to new IP header2 722 added for the tunnel mode, except that the packet length value is changed to reflect the new packet length. For example, the packet length value in new IP header2 726 is updated to reflect the combined length of new TCP header 724, ESP header 716, new IP header1 714, GRE header 712, original IP header 710, original TCP header 708, payload 706, ESP trailer 718 and ESP authentication data 720.

New IP header2 726 and new TCP header 724 allow packets to be properly routed and also allow conventional PEP techniques to be applied. More specifically, new IP header2 726 and new TCP header 724 appear to a router or PEP application as conventional IP and TCP headers, respectively, and allow ESP header 716, new IP header1 714, GRE header 712, original IP header 710, original TCP header 708, payload 706, ESP trailer 718 and ESP authentication data 720 to be conventionally processed as data.

Figure 8:
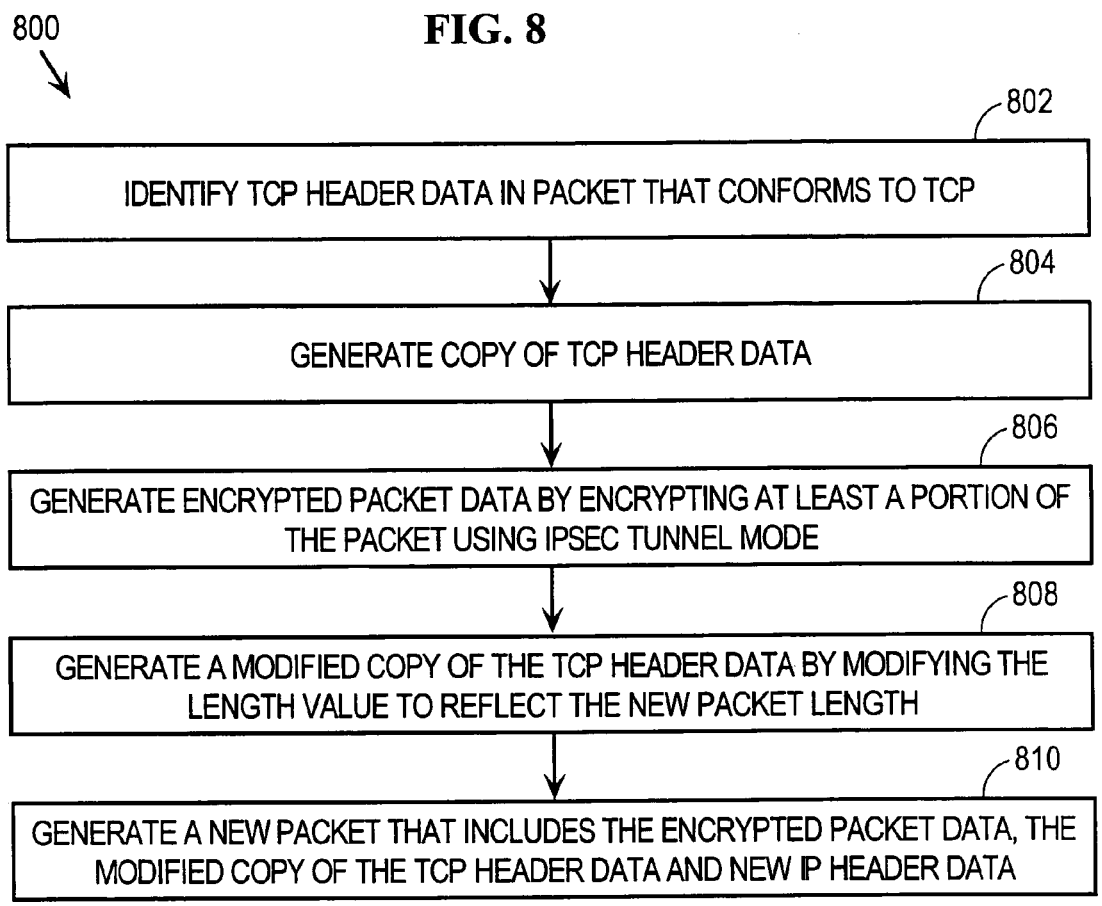
FIG. 8 is a flow diagram that depicts an approach for processing a packet using PEP-compatible TCP/IP GRE inside IPsec packet structure for the tunnel mode, according to one embodiment of the invention.

FIG. 8 is a flow diagram 800 that depicts an approach for processing a packet using PEP-compatible TCP/IP GRE inside IPsec packet structure 704 for the tunnel mode, according to one embodiment of the invention. In step 802, a packet is examined to identify TCP header data in the packet. For example, the packet may include a payload 706, an original TCP header 708 and an original IP header 710, as depicted in FIG. 7.

In step 804, a copy of the TCP header data is generated. For example, a copy is made of original TCP header 708 to generate new TCP header 724. In step 806, at least a portion of the packet is encrypted using GRE inside the IPsec tunnel mode. For example, as indicated by PEP-compatible TCP/IP GRE inside IPsec packet structure 704, this causes new IP header1 714 and GRE header 712 to be generated and new IP header1 714, GRE header 712, original IP header 710, original TCP header 708, payload 706 and ESP trailer 718 to be encrypted.

In step 808, a modified copy of the TCP header data is generated by modifying a length value in the copy of the TCP header data to reflect the new packet length. For example, the length value in new TCP header 724 is updated to reflect the combined length of ESP header 716, new IP header1 714, GRE header 712, original IP header 710, original TCP header 708, payload 706, ESP trailer 718 and ESP authentication data 720.

In step 810, a new packet is generated that includes the encrypted packet data, the modified copy of the original TCP header data and new IP header data. For example, the encrypted portion of the new packet includes the new IP header1 714, the GRE header 712, the original IP header 710, the original TCP header 708, payload 706 and ESP trailer 718. The new packet also includes new TCP header 724 and new IP header2 726. As previously described herein, new TCP header 724 includes all of the data from original TCP header 708, except that a packet length value contained in new TCP header 724 is changed to reflect the new packet length. New IP header2 726 is generated when GRE is used with IPsec in the tunnel mode, because the original IP header 710 is encrypted. A packet length value contained in new IP header2 726 is updated to reflect the new packet length. According to one embodiment of the invention, the packet length value in new IP header2 726 reflects new TCP header 724.

VI. Implementation Mechanisms

The approach described herein for implementing IPsec in PEP environments is applicable to a wide variety of contexts and implementations and the approach is not limited to any particular context or implementation. The approach may be implemented in any type of network device or element, such as a router, end station or VPN box. For example, a router servicing an IPsec satellite link may be configured to operate in a high latency mode. When operating in the high latency mode, the server adds packet header information to packets before they are put into the tunnel. This allows IPsec to be used with any existing PEP technique to improve performance over the satellite link. As another example, a network device servicing multiple communications links with different latencies may be configured with two tunnel interfaces: a low latency tunnel interface and a high latency tunnel interface. The low latency tunnel interface is used for communications on links with low latency while the high latency tunnel interface is used for communications on links with high latency. For example, the high latency tunnel interface may be used for communications on links having a latency of greater than 500 ms. The particular latency threshold used to select either the high latency or low latency tunnel interface may vary depending upon the particular implementation. The selection of a particular tunnel interface may be accomplished through, for example, an interface or operating system command. The additional overhead attributable to generating and processing the additional header data is generally small in relation to the performance improvements available through the use of any number of PEP techniques that conventionally cannot be easily used with IPsec.

Figure 9:
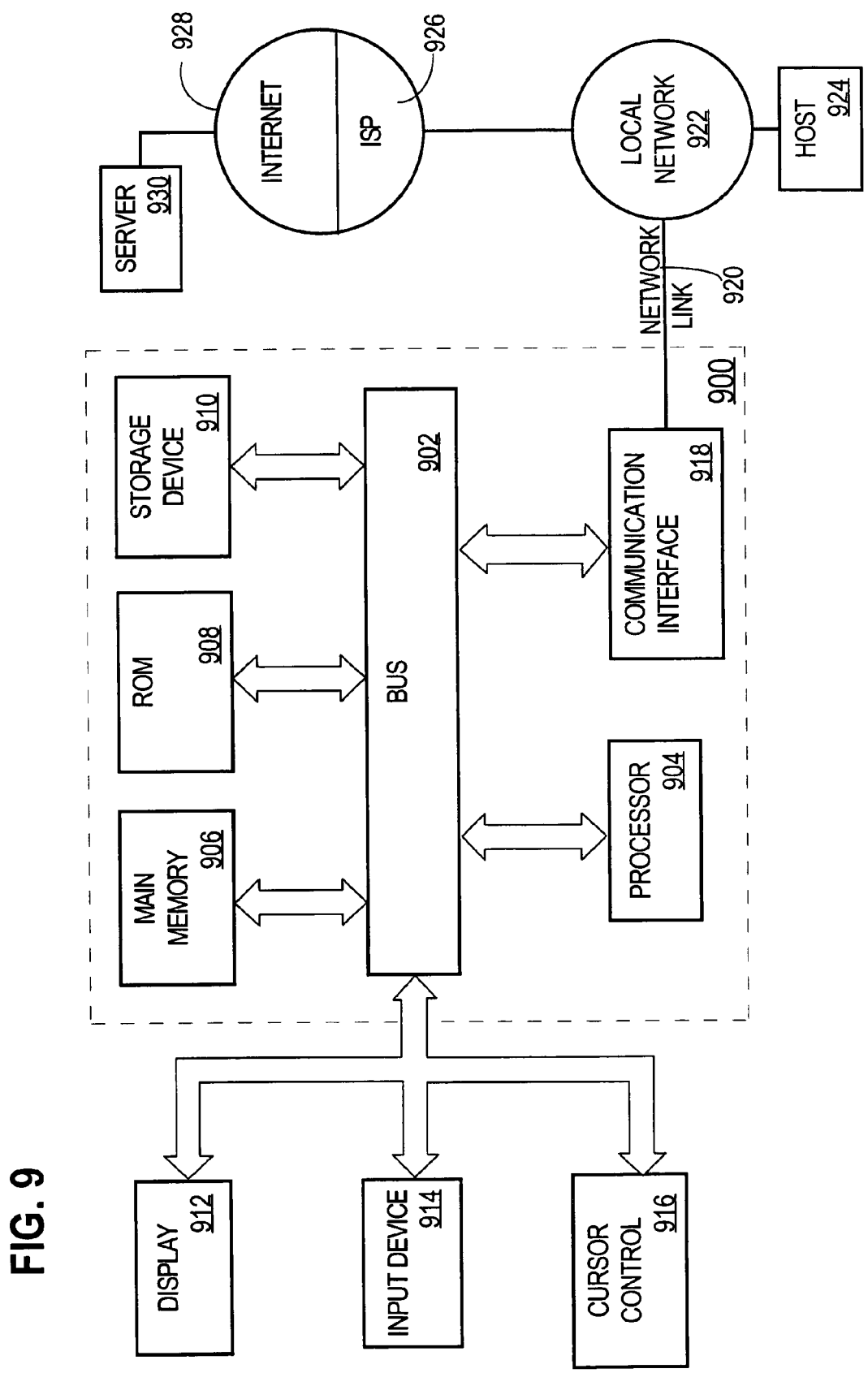
FIG. 9 is a block diagram of a computer system on which embodiments of the invention may be implemented.

The approach described herein may be implemented in hardware, computer software or any combination of hardware and computer software on any type of computing platform. For purposes of explanation, FIG. 9 is a block diagram that illustrates an example computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific fashion. In an embodiment implemented using computer system 900, various computer-readable media are involved, for example, in providing instructions to processor 904 for execution. Such a medium may take many forms, including but not limited to non-volatile media or volatile media. Non-volatile media includes, for example, optical or magnetic disks, such as storage device 910. Volatile media includes dynamic memory, such as main memory 906.

Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector can receive the data carried in the infrared signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for processing network packets, the computer-implemented method comprising:

identifying, in a packet that conforms to the TCP/Internet Protocol (IP) packet structure, original Transmission Control Protocol (TCP) header data that conforms to the TCP;

identifying, in the packet, original Internet Protocol (IP) header data that conforms to the IP;

generating a copy of the original TCP header data in the packet;

generating a copy of the original IP header data in the packet;

generating encrypted packet data by encrypting at least a portion of the packet using IPsec, wherein the encrypted packet data includes at least encrypted original TCP header data and encrypted payload data;

generating new TCP header data by:
including in the new TCP header data all the data from the copy of the original TCP header data except for a TCP packet length value in the copy of the original TCP header data, and modifying a length value in the new TCP header data to reflect a combined length of the encrypted packet data that at least includes an Encapsulated Security Payload (ESP) header, the original TCP header, payload data and an ESP trailer, wherein the new TCP packet length value in the new TCP header data enables the new TCP header data to be correctly processed by a performance enhancing proxy application;

generating new IP header data by:
including in the new IP header data all the data from the copy of the original IP header data except for an IP packet length value in the copy of the original IP header data, and including in the new IP header data a new IP packet length value that reflects a combined length of the encrypted packet data and a length of the new TCP header data, wherein the new IP packet length value in the new IP header data enables the new IP header data to be correctly processed by the performance enhancing proxy application; and generating a new packet, that conforms to the TCP/IP IPsec packet structure, that includes the new IP header data, the new TCP header data and the encrypted packet data;

providing the new packet, that conforms to the TCP/IP IPsec packet structure, for processing by the performance enhancing proxy application.

2. The computer-implemented method as recited in claim 1, wherein:
the IPsec transport mode is used to generate the encrypted data.

3. The computer-implemented method as recited in claim 1, wherein:
the IPsec tunnel mode is used to generate the encrypted packet data.

4. The computer-implemented method as recited in claim 1, wherein:
Generic Routing Encapsulation (GRE) inside IPsec in the transport mode is used to generate the encrypted packet data, wherein the encrypted packet data includes GRE header data.

5. The computer-implemented method as recited in claim 1, wherein:
Generic Routing Encapsulation (GRE) inside IPsec in the tunnel mode is used to generate the encrypted packet data, wherein the encrypted packet data includes GRE header data and first new IP header data.

6. A tangible computer-readable medium for processing network packets, the computer-readable medium carrying instructions which, when executed by one or more processors, cause:
identifying, in a packet that conforms to the TCP/Internet Protocol (IP) packet structure, original Transmission Control Protocol (TCP) header data that conforms to the TCP;
identifying, in the packet, original Internet Protocol (IP) header data that conforms to the IP;
generating a copy of the original TCP header data in the packet;
generating a copy of the original IP header data in the packet;
generating encrypted packet data by encrypting at least a portion of the packet using IPsec, wherein the encrypted packet data includes at least original TCP header data and encrypted payload data;
generating new TCP header data by:
including in the new TCP header data all the data from the copy of the original TCP header data except for a TCP packet length value in the copy of the original TCP header data, and
modifying a length value in the new TCP header data to reflect a combined length of the encrypted packet data that at least includes an Encapsulated Security Payload (ESP) header, the original TCP header, payload data and an ESP trailer,
wherein the new TCP packet length value in the new TCP header data enables the new TCP header data to be correctly processed by a performance enhancing proxy application;
generating new IP header data by:
including in the new IP header data all the data from the copy of the original IP header data except for an IP packet length value in the copy of the original IP header data, and
including in the new IP header data a new IP packet length value that reflects a combined length of the encrypted packet data and a length of the new TCP header data,
wherein the new IP packet length value in the new IP header data enables the new IP header data to be correctly processed by the performance enhancing proxy application; and
generating a new packet, that conforms to the TCP/IP IPsec packet structure, that includes the new IP header data, the new TCP header data and the encrypted packet data;
providing the new packet, that conforms to the TCP/IP IPsec packet structure, for processing by the performance enhancing proxy application.

7. The computer-readable medium as recited in claim 6, wherein:
the IPsec transport mode is used to generate the encrypted data.

8. The computer-readable medium as recited in claim 6, wherein:
the IPsec tunnel mode is used to generate the encrypted packet data.

9. The computer-readable medium as recited in claim 6, wherein:
Generic Routing Encapsulation (GRE) inside IPsec in the transport mode is used to generate the encrypted packet data, wherein the encrypted packet data includes GRE header data.

10. The computer-readable medium as recited in claim 6, wherein:
Generic Routing Encapsulation (GRE) inside IPsec in the tunnel mode is used to generate the encrypted packet data, wherein the encrypted packet data includes GRE header data and first new IP header data.

11. An apparatus for processing network packets, the apparatus comprising a memory storing instructions which, when executed by one or more processors, cause:
identifying, in a packet that conforms to the TCP/Internet Protocol (IP) packet structure, original Transmission Control Protocol (TCP) header data that conforms to the TCP;
identifying, in the packet, original Internet Protocol (IP) header data that conforms to the IP;
generating a copy of the original TCP header data in the packet;
generating a copy of the original IP header data in the packet;
generating encrypted packet data by encrypting at least a portion of the packet using IPsec, wherein the encrypted packet data includes at least encrypted original TCP header data and encrypted payload data
generating new TCP header data by:
including in the new TCP header data all the data from the copy of the original TCP header data except for a TCP packet length value in the copy of the original TCP header data, and
modifying a length value in the new TCP header data to reflect a combined length of the encrypted packet data that at least includes an Encapsulated Security Payload (ESP) header, the original TCP header, payload data and an ESP trailer,
wherein the new TCP packet length value in the new TCP header data enables the new TCP header data to be correctly processed by a performance enhancing proxy application;
generating new IP header data by:
including in the new IP header data all the data from the copy of the original IP header data except for an IP packet length value in the copy of the original IP header data, and
including in the new IP header data a new IP packet length value that reflects a combined length of the encrypted packet data and a length of the new TCP header data,
wherein the new IP packet length value in the new IP header data enables the new IP header data to be correctly processed by the performance enhancing proxy application; and
generating a new packet, that conforms to the TCP/IP IPsec packet structure, that includes the new IP header data, the new TCP header data and the encrypted packet data;
providing the new packet, that conforms to the TCP/IP IPsec packet structure, for processing by the performance enhancing proxy application.

12. The apparatus as recited in claim 11, wherein:
the IPsec transport mode is used to generate the encrypted data.

13. The apparatus as recited in claim 11, wherein:
the IPsec tunnel mode is used to generate the encrypted packet data.

14. The apparatus as recited in claim 11, wherein:
Generic Routing Encapsulation (GRE) inside IPsec in the transport mode is used to generate the encrypted packet data, wherein the encrypted packet data includes GRE header data.

15. The apparatus as recited in claim 11, wherein:
Generic Routing Encapsulation (GRE) inside IPsec in the tunnel mode is used to generate the encrypted packet data, wherein the encrypted packet data includes GRE header data and first new IP header data.

16. An apparatus for processing network packets, the apparatus comprising:
means for identifying, in the packet that conforms to the TCP/Internet Protocol (IP) packet structure, original Transmission Control Protocol (TCP) header data that conforms to the TCP;
means for identifying, in the packet, original Internet Protocol (IP) header data that conforms to the IP;
means for generating a copy of the original TCP header data in the packet;
means for generating a copy of the original IP header data in the packet;
means for generating encrypted packet data by encrypting at least a portion of the packet using IPsec, wherein the encrypted packet data includes at least encrypted original TCP header data and encrypted payload data;
means for generating new TCP header data by:
including in the new TCP header data all the data from the copy of the original TCP header data except for a TCP packet length value in the copy of the original TCP header data, and
modifying a length value in the new TCP header data to reflect a combined length of the encrypted packet data that at least includes an Encapsulated Security Payload (ESP) header, the original TCP header, payload data and an ESP trailer,
wherein the new TCP packet length value in the new TCP header data enables the new TCP header data to be correctly processed by a performance enhancing proxy application;
means for generating new IP header data by:
including in the new IP header data all the data from the copy of the original IP header data except for an IP packet length value in the copy of the original IP header data, and
including in the new IP header data a new IP packet length value that reflects a combined length of the encrypted packet data and a length of the new TCP header data,
wherein the new IP packet length value in the new IP header data enables the new IP header data to be correctly processed by the performance enhancing proxy application; and
means for generating a new packet, that conforms to the TCP/IP IPsec packet structure, that includes the new IP header data, the new TCP header data and the encrypted packet data;
providing the new packet, that conforms to the TCP/IP IPsec packet structure, for processing by the performance enhancing proxy application.

17. The apparatus as recited in claim 16, wherein:
the IPsec transport mode is used to generate the encrypted data.

18. The apparatus as recited in claim 16, wherein:
the IPsec tunnel mode is used to generate the encrypted packet data.

19. The apparatus as recited in claim 16, wherein:
Generic Routing Encapsulation (GRE) inside IPsec in the transport mode is used to generate the encrypted packet data, wherein the encrypted packet data includes GRE header data.

20. The apparatus as recited in claim 16, wherein:
Generic Routing Encapsulation (GRE) inside IPsec in the tunnel mode is used to generate the encrypted packet data, wherein the encrypted packet data includes GRE header data and first new IP header data.

* * * * *